(12) United States Patent
Leftridge, Sr.

(10) Patent No.: US 6,570,494 B1
(45) Date of Patent: May 27, 2003

(54) MOSQUITO GUARD

(76) Inventor: Kenneth Charles Leftridge, Sr., 4630 W. 188 St., Country Club Hills, IL (US) 60478-5411

( * ) Notice: Subject to any disclaimer, the term of this patent is extended or adjusted under 35 U.S.C. 154(b) by 0 days.

(21) Appl. No.: 09/452,260

(22) Filed: Dec. 1, 1999

(51) Int. Cl.⁷ .................................................. G08B 3/10
(52) U.S. Cl. ...................... 340/384.2; 43/132.1; 43/107; 116/22 A; 367/139
(58) Field of Search .......................... 340/384.2; 43/124, 43/16, 132.1, 133, 107, 131, 136, 1; 367/139; 116/22 A

(56) References Cited

U.S. PATENT DOCUMENTS

| | | | |
|---|---|---|---|
| 2,922,999 A | 1/1960 | Carlin | 340/384 |
| 3,886,492 A | 5/1975 | White | 340/15 |
| 3,931,865 A * | 1/1976 | Leivtt | 43/132.2 |
| 4,045,663 A | 8/1977 | Young | 240/10.6 |
| 4,484,315 A * | 11/1984 | Hall | 367/139 |
| 4,563,759 A * | 1/1986 | Hayakawa | 367/139 |
| 4,566,085 A * | 1/1986 | Weinberg | 367/139 |
| 4,658,386 A * | 4/1987 | Morris | 367/139 |
| 5,065,975 A * | 11/1991 | Giles | 248/545 |
| 5,214,619 A * | 5/1993 | Yoshida | 367/139 |
| 5,244,438 A | 9/1993 | Buss | 116/22 A |
| D344,319 S | 2/1994 | Liu | D22/120 |
| D370,247 S * | 5/1996 | Shammas | D22/120 |
| 5,575,106 A * | 11/1996 | Martin et al. | 43/132.1 |
| 5,598,379 A * | 1/1997 | Malleolo | 367/139 |
| 5,602,523 A | 2/1997 | Turchioe | 340/384.2 |
| 5,657,576 A * | 8/1997 | Nicosia | 43/132.1 |
| 5,850,371 A * | 12/1998 | Jan | 367/139 |

* cited by examiner

Primary Examiner—Brent A. Swarthout

(57) ABSTRACT

A waterproof cabinet, speakers, power source, processor, and solar panel which together operate to emit high frequency sound waves that can repel mosquitoes and other flying pests.

19 Claims, 3 Drawing Sheets

MOSQUITO GUARD

BACKGROUND OF THE INVENTION

1. Field of the Invention

The present invention relates to ultrasonic and sonic devices for repelling insects and in particular to ultrasonic and sonic devices for repelling mosquitos.

2. Description of the Prior Art

The prior art discloses a variety of inventions for repelling mice, rodents, deer and insects by means of transmission of ultrasonic and sonic signals. For example, U.S. Pat. 5,602,523 discloses a square wave signal output in the ultrasonic frequency range with harmonic distortion for repelling deer. U.S. Pat. No. 5,224,438 discloses a tube inserted in the ground for creating audible vibrations to repel rodents. U.S. Pat. No. 2,922,999 discloses a system for repelling birds with ultrasonic sound. U.S. Pat. No. 3,886,492 discloses a sonic device designed specifically for repelling insects. The '492 patent discloses that insects can be repelled by duplicating the sounds of natural predators and that by using sounds at certain frequencies and at certain intensities, insects can be excluded from predictable dimensional areas. The '492 patent discloses that it is known in the art that female mosquitos have an antipathy to sonic frequencies from 11 to 12 kilohertz and from 36 to 38 kilohertz. The '492 patent further discloses that "since only the female mosquitos bite and since the males will follow the exodus of the females, the problem of eliminating mosquitos may be solved by generating sonic frequencies concentrated in these ranges." The '492 patent focuses on the sonic waveform and providing a multitude of frequencies to avoid high intensities which would be objectionable to humans.

What is needed beyond the prior art is a practical device that can employ the principles known in the art in a practical and useful way. An outdoor device that can sonically repel insects would reduce or eliminate the need to spray the air with chemicals. (Burning oil, one way of repelling mosquitos, causes pollution). Persons within the zone of the device would not need to apply repellant to their skin. A device that can emit the appropriate signals and that can be installed outdoors and moved as necessary would be desirable. Moreover, a device that could operate on batteries so that it could be located independently of a power source would be desirable. Furthermore, a device that could operate for long periods without recharging or battery changes would be desirable.

SUMMARY OF THE INVENTION

The present invention meets the needs identified above by providing a waterproof cabinet, speakers, power source, processor, and solar panel which together operate to emit high frequency sound waves that can repel mosquitoes and other flying pests. The cabinet can contain one, two or four speakers, solar cells in a panel on the top of the cabinet, a rechargeable nicle-cadmium battery, electrical wiring and circuitry, and a circuit board or an Integrated Circuit (IC) chip to generate wave forms of frequency above the range of human hearing. The output strength would be in the range of 100 db to 135 db. The device, when activated, emits ultrasonic sounds to replicate the wing-beat frequency of the Dragonfly, the mosquito's most significant predator and sonic sounds to replicate the wing-speed sound of the male mosquito (to repel females who have already mated). Additionally, the device may emit sonic frequencies from 11 to 12 kilohertz and from 36 to 38 kilohertz. One speaker can generate 90 degree coverage (about 1,000 square feet), and four speakers can provide 360 degree coverage (about 2–3,000 square feet). The device can be hung from a tree limb or overhang. Alternatively, the device can be mounted on a free standing pole with base. Therefore, the device can be easily installed and maintained.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figures 1, 2:
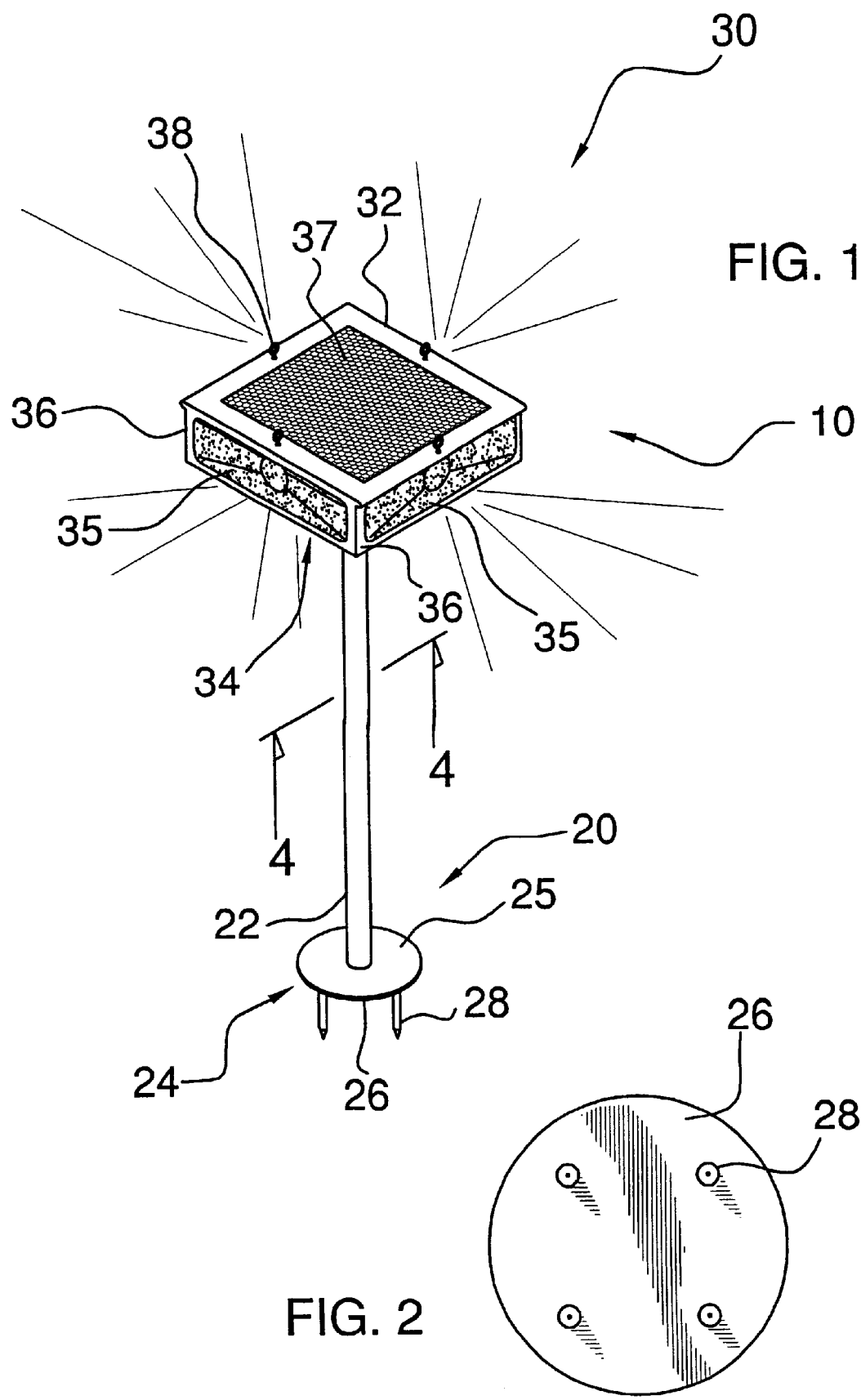
FIG. 1 is a front elevational view of the invention mounted on a pole.
FIG. 2 is a bottom view of the base of the pole.

In FIG. 1, guard 10 is shown with cabinet 30 and pole 20. Cabinet 30 has top 32 and sides 36. In the preferred embodiment cabinet 30 has four sides 36. Top 32 has solar panel 37 affixed to top 32. Guard 10 may operate without solar panel 37. In the preferred embodiment, Solar panel 37 consists of photovoltaic cells utilizing flat-plate modules of cut and polished wafer-like cells of crystalline silicon which would be obtained from commercial manufacturers. Bottom 34 is not seen in FIG. 1 and attaches to pole 22. Pole 22 is fixedly engaged to stand 24. Top 32 has a plurality of hooks 38 for alternative mounting of cabinet 30 by means of supporting wires connected to hooks 38. Each of sides 36 has aperture 35. Support 20 has pole 22 and base 24. In the preferred embodiment, pole 22 is approximately six feet long and base 24 is approximately 9 inches in diameter. Base 24 has base top 25 and base bottom 26 (not shown). Base bottom 26 has a plurality of spikes 28 fixedly attached to base bottom 26. Persons skilled in the art will be familiar with a variety of ways to construct pole 22 and that pole 22 can be in one piece or in a plurality of interconnecting sections. In the preferred embodiment, pole 22 is made from heavy-duty coated stainless steel tubing and base 24 is made from coated stainless steel. Likewise, a variety of ways of fixedly or removably attaching pole 22 to base 24 and fixedly or removably attaching spikes 28 to base bottom 26 are known to persons skilled in the art. Cabinet 30 may be constructed from any suitable material such as plastic or polystyrene. In the preferred embodiment, cabinet 30 is constructed so that top 32 and sides 36 are sealingly engaged. Top 32 and sides 36 may be made from one piece of material.

Figure 4:
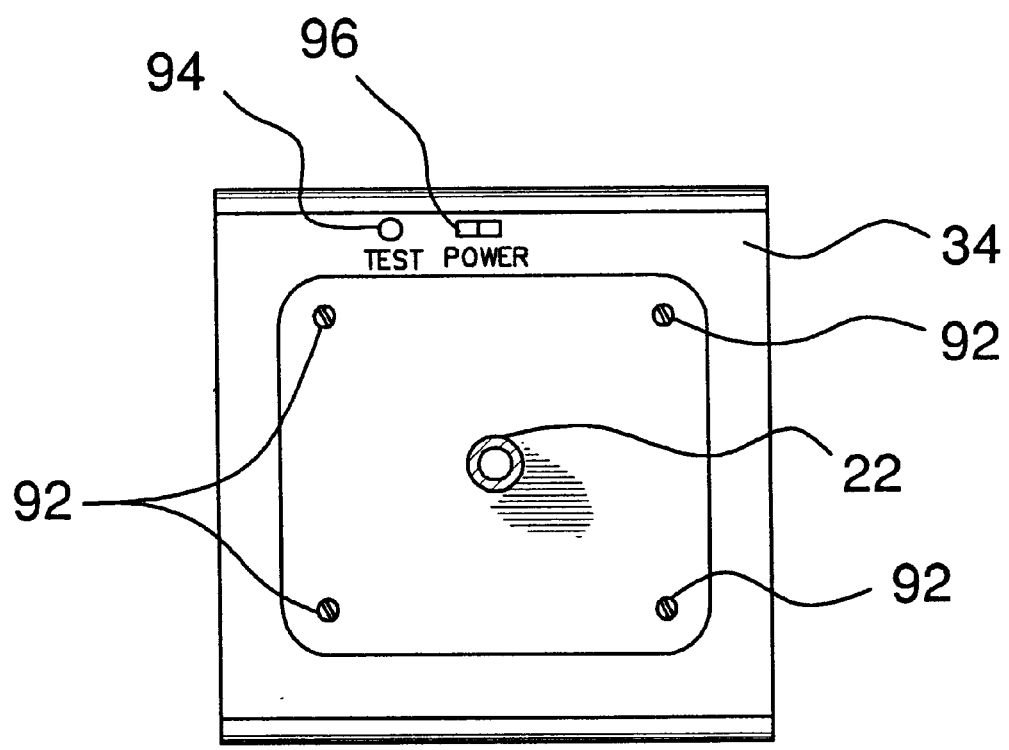
FIG. 4 is bottom view of the device cabinet.

FIG. 2 depicts base bottom 26 of base 24 with spikes 28 affixed to base bottom 26. Four spikes 28 are shown in FIG. 4. However, persons skilled in the art will know that any number of spikes could be utilized depending on the length and thickness of the spikes utilized. Selecting the optimum number of spikes is within the knowledge of persons skilled in the art. In an alternative embodiment, a single large screw is fixedly engaged to base bottom 26 so that base 24 can be screwed into the ground until base bottom 26 contacts the ground.

Figure 3:
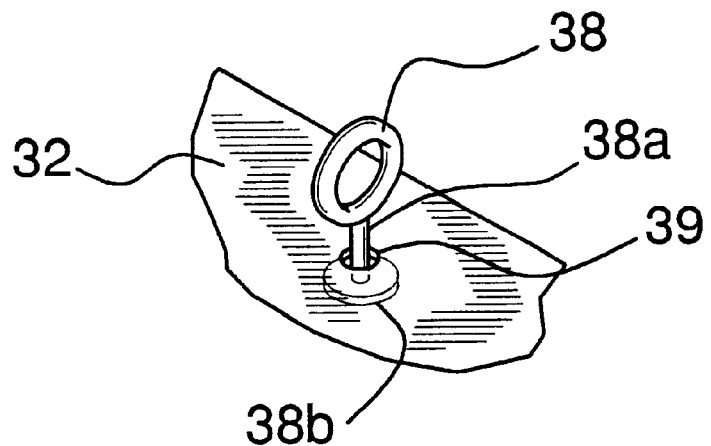
FIG. 3 is a detail view of a swivel hook for hanging the device.

FIG. 3 depicts a detail view of hook 38. Hook 38 has hook arm 38a and hook base 38b. Top 32 has hook hole 39 for receiving hook arm 38a. When assembling top 32, hook arm 38a is inserted into hook hole 39 and hook base 38b is attached to hook arm 39a. Persons skilled in the art will be familiar with a variety of methods of affixing hook base 38b to hook arm 39a.

FIG. 4 depicts a bottom view of cabinet 30. Bottom 34 has mounting plate 90 attached by means of a plurality of securement devices 92. In the preferred embodiment securement devices 92 are screws. Mounting plate 90 is fixedly attached to pole 22. Pole 22 may be attached to mounting plate 90 by a variety of means known to persons skilled in the art such as a threaded connection between pole 22 and mounting plate 90 or inserting pole 22 into a socket on mounting plate 90. Bottom 34 also has test switch 94 and power switch 96. Test switch 94 and power switch 96 are connected by wires to power source 50 (not shown).

Figure 5:
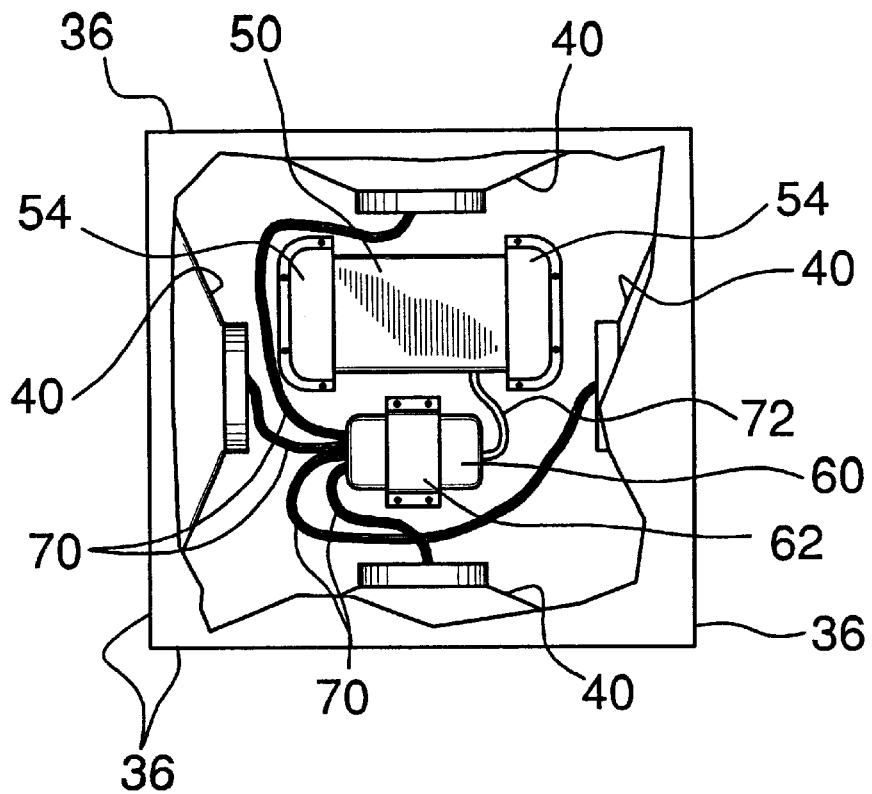
FIG. 5 is an interior view of the cabinet.

FIG. 5 depicts the interior of cabinet 30. A plurality of speakers 40 are attached to sides 36 and are sealingly engaged to apertures 35 (not shown in FIG. 5). Speakers 40 have a very high frequency response and a size to conform to sealing engagement with aperture 35 of side 36 of cabinet 30. Processor 60 is affixed to cabinet 30 by processor bracket 62. Processor 60 is connected to speakers 40 by output wires 70. Processor 60 is connected to power source 50 by power wire 72. Battery 50 is affixed to cabinet 30 by brackets 54. Panel wires (not shown) connect solar panel 37 (not shown in FIG. 5) to power source 50 and processor 60. In the preferred embodiment, power source 50 is a rechargeable nickel-cadmium battery. However, power source 50 may be any suitable battery whether rechargeable or not which is capable of operating processor 50 and speakers 40. In the preferred embodiment, processor 60 may be a simple circuit board or an integrated circuit chip designed and fabricated by conventional processes to produce ultrasonic sounds to replicate the wing-beat frequency of the dragonfly and the wing-speed sound of the male mosquito. Additionally, processor 60 may be designed to emit sonic frequencies from 11 to 12 kilohertz and from 36 to 38 kilohertz.

Figure 6:
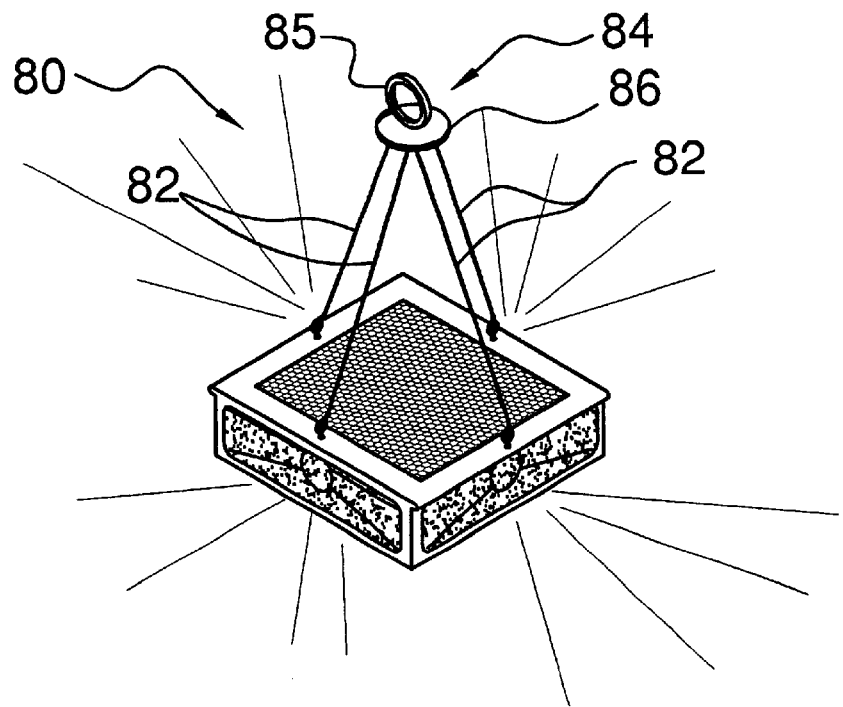
FIG. 6 is a front elevational view of the device supported by hanging.

FIG. 6 shows hanging guard 80 with ring 84 and suspension wires 82 affixed to hooks 38.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for repelling mosquitoes comprising:
a cabinet having a flat top, a bottom, four sides, and four apertures in said sides;
at least four speakers sealingly affixed to said four apertures;
a power supply connected to the cabinet;
a solar panel affixed to said flat top and connected to said power supply;
a processor connected to said power supply, said speakers and said cabinet; means for suspending said apparatus above the ground
wherein said processor causes the speaker to only emit ultrasonic and sonic sounds to replicate the wing-beat frequency of the dragonfly and the wing-speed sound of the male mosquito;
wherein said at least four speakers provide 360 degree coverage and an output range of 110 db to 130 db wherein said solar panel consists of photovoltaic cells a utilizing flat-plate modules of cut and polished wafer-line cells of crystalline silicone.

2. The apparatus of claim 1 further comprising a solar panel affixed to said cabinet and connected to said power supply wherein said solar panel consists of photovoltaic cells utilizing flat-plate modules of cut and polished wafer-line cells of crystalline silicon.

3. The apparatus of claim 1 further comprising a test switch.

4. The apparatus of claim 1 further comprising a power switch.

5. The processor of claim 1 wherein said processor is a circuit board which when powered emits sonic frequencies from 11 to 12 kilohertz.

6. The processor of claim 1 wherein said processor is a circuit board which when powered emits sonic frequencies from 36 to 38 kilohertz.

7. The processor of claim 1 wherein said processor is an integrated circuit chip which when powered emits sonic frequencies from 11 to 12 kilohertz.

8. The processor of claim 1 wherein said processor is an integrated circuit chip which when powered emits sonic frequencies from 36 to 38 kilohertz.

9. The apparatus of claim 1 further comprising;
a mounting plate fixedly engaged to said cabinet;
a pole removably engaged to said mounting plate;
a base removably engaged to said pole, said base having a base bottom fixedly engaged to said base; and
a plurality of spikes affixed to said base bottom.

10. The cabinet of claim 1 further comprising:
a top having a plurality of hook holes for receiving a plurality of hooks;
a bottom;
a plurality of sides;
a plurality of apertures in said sides for sealing engagement of the plurality of speakers.

11. The cabinet of claim 1 further comprising a plurality of hooks fixedly and rotatably engaged in said hook holes.

12. An apparatus for housing a processor for emitting sonic frequencies selected to repel mosquitoes comprising:
a cabinet having a flat top, a bottom and a at least four sides, each of said sides having an aperture;
a processor connected to said cabinet and to at least four speakers sealingly engaged with said at least four sides and connected to the processor;
a power source connected to the processor;
a solar panel affixed to said flat-top and connected to said power source;
a mounting plate fixedly and removably engaged to said bottom;
a pole removably engaged to said mounting plate;
a base fixedly or removably connected to said pole;
at least one spike fixedly or removably connected to said base;
wherein said processor causes the speakers to emit sonic and ultrasonic sounds to replicate the wing-beat frequency of the dragonfly and the wing-speed sound of the male mosquito; and
wherein said at least four speakers provide 360 degree coverage and an output range of 110 db to 130 db wherein said solar panel consists of photovoltaic cells utilizing flat-plate modules of cut and polished wafer-line cells of crystalline silicon.

13. The processor of claim 12 wherein said processor is a circuit board which when powered emits sonic frequencies from 11 to 12 kilohertz.

14. The processor of claim 12 wherein said processor is a circuit board which when powered emits sonic frequencies from 36 to 38 kilohertz.

15. The processor of claim 12 wherein said processor is an integrated circuit chip which when powered emits sonic frequencies from 11 to 12 kilohertz.

16. The processor of claim 12 wherein said processor is an integrated circuit chip which when powered emits sonic frequencies from 36 to 38 kilohertz.

17. The apparatus of claim 12 further comprising a test switch.

18. The apparatus of claim 12 further comprising a power switch.

19. An apparatus for housing a processor for emitting sonic frequencies selected to repel mosquitoes comprising:

a cabinet having a flat top, a bottom and at least four sides, each of said at least four sides having an aperture;

at least four speakers sealingly engaged with said apertures and connected to the processor;

a power source connected to the processor;

a test switch connected to said power source;

a power switch connected to said power source;

a solar panel affixed to said flat top and connected to said power source;

a plurality of hooks fixedly and rotatably engaged to said flat top;

a ring mount;

a plurality of wires fixedly or removably engaged to said hooks and to said ring mount;

wherein said processor comprises a circuit board or integrated circuit chip which when powered emits sonic frequencies from 11 to 12 kilohertz and ultrasonic frequencies from 36 to 38 kilohertz in order to replicate the wing-beat frequency of the dragonfly and the wing-speed sound of the male mosquito wherein said at least four speakers provide 360 degree coverage and an output range of 110 db to 130 db; and wherein said solar panel consists of photovoltaic cells utilizing flat-plate modules of cut and polished wafer-line cells of crystalline silicon.

\* \* \* \* \*